United States Patent
Walsh et al.

(10) Patent No.: US 9,331,746 B2
(45) Date of Patent: May 3, 2016

(54) SYSTEM AND METHOD FOR PROVIDING INFORMATION TO AND/OR OBTAINING INFORMATION FROM A COMPONENT OF AN ELECTRICAL DISTRIBUTION SYSTEM

(71) Applicant: EATON CORPORATION, Cleveland, OH (US)

(72) Inventors: Patrick T. Walsh, Coraopolis, PA (US); Deborah K. Mort, Coraopolis, PA (US); David R. Rohn, Venetia, PA (US)

(73) Assignee: EATON CORPORATION, Cleveland, OH (US)

( * ) Notice: Subject to any disclaimer, the term of this patent is extended or adjusted under 35 U.S.C. 154(b) by 307 days.

(21) Appl. No.: 13/719,477

(22) Filed: Dec. 19, 2012

(65) Prior Publication Data

US 2014/0170971 A1    Jun. 19, 2014

(51) Int. Cl.
*H04B 5/00* (2006.01)
*G06K 7/10* (2006.01)
*H01H 9/16* (2006.01)

(52) U.S. Cl.
CPC .......... *H04B 5/0031* (2013.01); *G06K 7/10544* (2013.01); *H01H 9/167* (2013.01); *H01H 9/168* (2013.01); *H01H 2300/032* (2013.01); *Y02B 90/224* (2013.01); *Y04S 20/14* (2013.01)

(58) Field of Classification Search
CPC combination set(s) only.
See application file for complete search history.

(56) References Cited

U.S. PATENT DOCUMENTS

| 7,570,470 | B2 * | 8/2009 | Holley .................. H01H 9/168 |
| | | | 361/64 |
| 7,948,343 | B2 | 5/2011 | Carlino et al. |
| 2002/0021226 | A1 * | 2/2002 | Clement et al. .......... 340/870.31 |
| 2009/0072022 | A1 * | 3/2009 | Tripathi ........................ 235/380 |
| 2009/0326900 | A1 * | 12/2009 | Carlino et al. ................... 703/14 |
| 2014/0357190 | A1 * | 12/2014 | Bouvet et al. ................ 455/41.1 |

FOREIGN PATENT DOCUMENTS

| EP | 1179827 A1 | 2/2002 |
| EP | 1808879 A1 | 7/2007 |
| EP | 2040280 A2 | 3/2009 |

OTHER PUBLICATIONS

European Patent Office, International Search Report and the Written Opinion for International Application No. PCT/US2013/068627, Jan. 29, 2014.

* cited by examiner

*Primary Examiner* — Junpeng Chen
(74) *Attorney, Agent, or Firm* — Eckert Seamans Cherin & Mellott, LLC; Philip E. Levy; Grant E. Coffield

(57) ABSTRACT

An electrical distribution system wherein information is communicated to and/or from an electrical component of the electrical distribution system using near-field communications. The information may be communicated to and/or from the electrical component using an electronic device such as a dedicated near-field device, a smartphone or a configuration card device. Also, a method of obtaining information from an electrical component of an electrical distribution system, such as a circuit interrupter, includes generating a machine readable element that comprises first information in encoded form, the first information relating to the operation and/or status of the circuit interrupter, displaying the machine readable element on the circuit interrupter, capturing an image of the machine readable element, obtaining the first information based on the image, and displaying second information based on the obtained first information.

11 Claims, 11 Drawing Sheets

SYSTEM AND METHOD FOR PROVIDING INFORMATION TO AND/OR OBTAINING INFORMATION FROM A COMPONENT OF AN ELECTRICAL DISTRIBUTION SYSTEM

BACKGROUND

1. Field

This invention pertains generally to electrical distribution systems that include components such as, without limitation, circuit interrupters and, more particularly, to systems and methods for providing information, such as, without limitation, configuration information, to components (such as a circuit breaker) of an electrical distribution system and/or for obtaining information, such as, without limitation, configuration information and/or diagnostic information, from components (such as a circuit breaker) of an electrical distribution system.

2. Background Information

Electrical switching apparatus for electrical distribution systems, such as circuit interrupters and, in particular, circuit breakers of the molded case variety, are well known in the art. See, for example, U.S. Pat. No. 5,341,191.

Circuit breakers are used to protect electrical circuitry from damage due to an overcurrent condition, such as an overload condition or a relatively high level short circuit or fault condition. Molded case circuit breakers typically include separable contacts which may be operated either manually by way of a handle disposed on the outside of the case or automatically in response to an overcurrent condition. Typically, such circuit breakers include: (i) an operating mechanism which is designed to rapidly open and close the separable contacts, and (ii) a trip unit which senses overcurrent conditions in an automatic mode of operation. Upon sensing an overcurrent condition, the trip unit trips the operating mechanism to a trip state, which moves the separable contacts to their open position.

Industrial circuit breakers often use a circuit breaker frame which houses a trip unit. See, for example, U.S. Pat. Nos. 5,910,760; and 6,144,271. The trip unit may be modular and may be replaced in order to alter the electrical properties of the circuit breaker.

It is well known to employ trip units which utilize a microprocessor to detect various types of overcurrent trip conditions and to provide various protection functions, such as, for example, a long delay trip, a short delay trip, an instantaneous trip, and/or a ground fault trip. The long delay trip function protects the load served by the protected electrical system from overloads and/or overcurrents. The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. As implied, the ground fault trip function protects the electrical system from faults to ground.

Each circuit breaker is designed for a specific maximum continuous current. This current rating may be set by a suitable selection mechanism, such as by a rotary switch or by selection of a resistor (e.g., a "rating plug") which converts a current to a voltage for use by the trip unit. In some instances, a single circuit breaker frame may be easily adapted for installations which call for a range of maximum continuous currents, up to the design limits of the frame, through use of the selection mechanism by which the current rating of the device can be established. Typically, the pick-up currents for the various protection functions have been selectable multiples or fractions of this current rating. Thus, instantaneous protection trips the device any time the current reaches a selected multiple of the rated current, such as, for example, ten times the rated current. Pick-up for short delay protection is a multiple of the rated current, while pick-up current for long delay protection may be a fraction of the rated current. Typically, the short delay trip is only generated when the short delay pick-up current is exceeded for a short delay time interval, although, in some applications, an inverse time function is also used for short delay protection.

Currently, many electronic trip units use adjustable (e.g., without limitation, rotary) switches to vary functional trip settings, such as, for example and without limitation, long delay pickup (Ir), long delay time (LDT), short delay pickup (SDPU), ground fault pickup (GFPU), and short delay time and ground fault time (SDT/GFT). The adjustable switches are typically labeled on a per unit basis and are common to all current sensor (e.g., current transformer) types.

There is room for improvement in electrical distribution systems that include components such as, without limitation, circuit interrupters, and, in particular, in the area of providing information to and/or obtaining information from components of an electrical distribution system such as a circuit breaker.

SUMMARY

In one embodiment, an electrical distribution system is provided that includes an electrical component having a first near-field communications chip coupled to a first near-field communications coupling element, and an electronic device having a second near-field communications chip coupled to a second near-field communications coupling element, wherein the electronic device is structured to transmit first information to the first near-field communications chip and/or receive second information from the first near-field communications chip over a near-field communications interface established between the first near-field communications coupling element and the second near-field communications coupling element.

In another embodiment, a method of transferring information in an electrical distribution system having an electrical component having a first near-field communications chip coupled to a first near-field communications coupling element and an electronic device having a second near-field communications chip coupled to a second near-field communications coupling element is provided. The method includes establishing a near-field communications interface between the first near-field communications coupling element and the second near-field communications coupling element, and performing at least one of: (i) transmitting first information to the first near-field communications chip over the near-field communications interface, and (ii) receiving second information from the first near-field communications chip over the near-field communications interface.

In yet another embodiment, a method of configuring an electrical component having a first near-field communications chip coupled to a first near-field communications coupling element includes providing a configuration card device (64) having a second near-field communications chip coupled to a second near-field communications coupling element, the configuration card device storing configuration information for the electrical component, establishing a near-field communications interface between the first near-field communications coupling element and the second near-field communications coupling element, transmitting the configuration information from the configuration card device to the first near-field communications chip over the near-field communications interface, and configuring the electrical component based on the configuration information.

In still another embodiment, a circuit interrupter system is provided that includes a circuit interrupter, the circuit interrupter having a first processor apparatus and a first display, the first processor apparatus being structured to: (i) generate a machine readable element that comprises first information in encoded form, the first information relating to the operation and/or status of the circuit interrupter, and (ii) cause the machine readable element to be displayed on the first display, and a portable computing device having a second processor apparatus, a second display, and an image capture device, the second processor apparatus being structured to: (i) cause the image capture device to capture an image of the machine readable element, (ii) obtain the first information based on the image, and (iii) cause second information to be displayed on the second display based on the obtained first information.

In yet another embodiment, a method of obtaining information from an electrical component of an electrical distribution system, such as a circuit interrupter, includes generating a machine readable element that comprises first information in encoded form, the first information relating to the operation and/or status of the circuit interrupter, displaying the machine readable element on the circuit interrupter, capturing an image of the machine readable element, obtaining the first information based on the image, and displaying second information based on the obtained first information.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
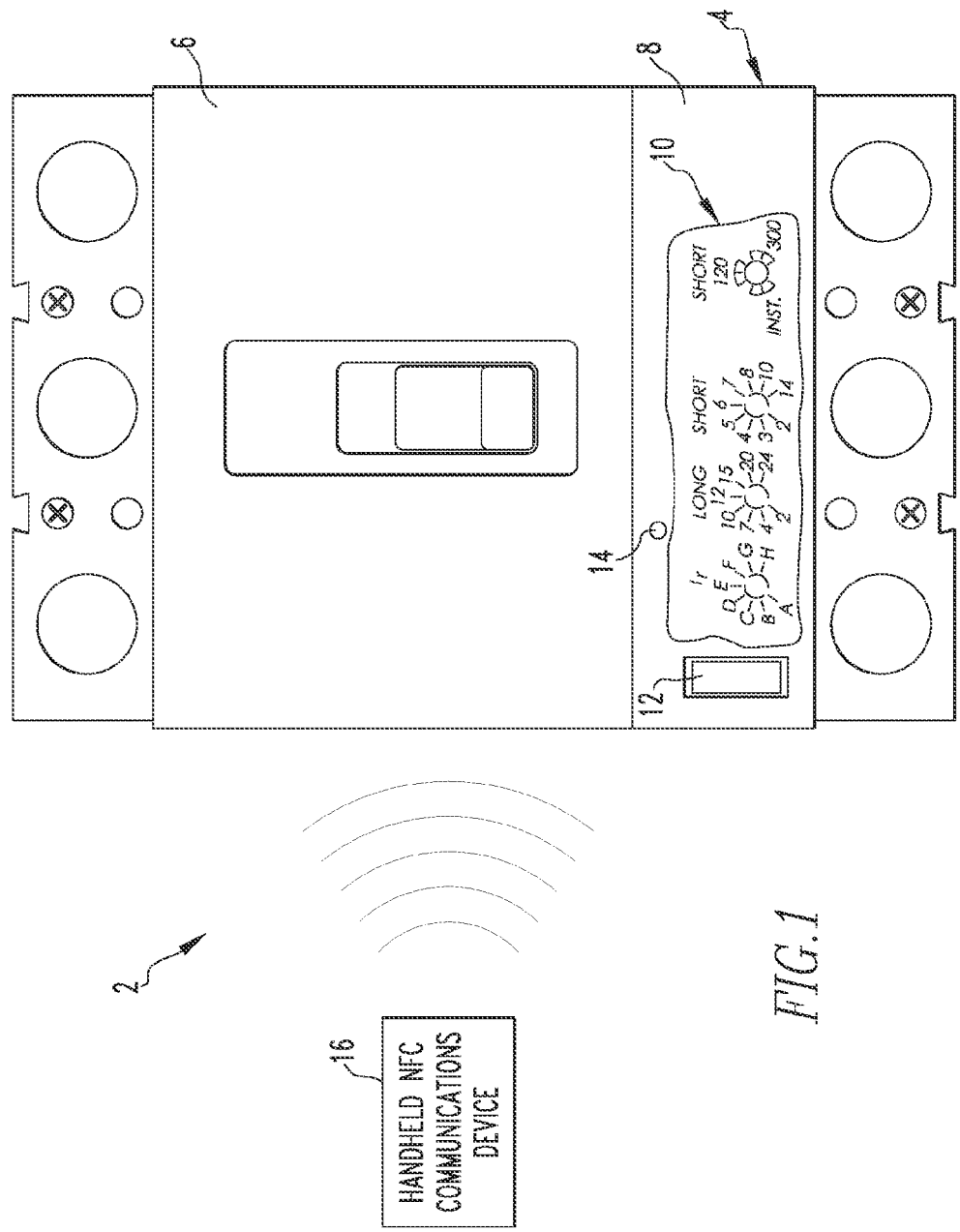
FIG. 1 is a schematic diagram of a circuit interrupter system according to an exemplary embodiment of the present invention.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As used herein, "near-field communications" or "NFC" shall mean a technique wherein two devices are coupled to one another and wirelessly transfer power and/or information within the near-field over a short distance (such as, without limitation, about four cm) using coupled inductive circuits. Near-field communications are governed by various standards, such as, without limitation, ISO/IEC 18092, ECMA-340, ISO/IEC 21481, and ECMA-352.

As used herein, the term "near-field" shall mean a region that is in proximity to an electromagnetic radiating structure, such as an antenna or coil, where the electric and magnetic fields do not have a plane-wave characteristic, but instead vary greatly from one point to another. Furthermore, the near-field can be subdivided into two regions which are commonly known as the reactive near-field and the radiating near-field. The reactive near-field is closest to the radiating structure and contains almost all of the stored energy, whereas the radiating near-field is where the radiation field is dominant over the reactive field but does not possess plane-wave characteristics and is complicated in structure. This is in contrast to the far-field, which is generally defined as the region where the electromagnetic field has a plane-wave characteristic, i.e., it has a uniform distribution of the electric and magnetic field strength in planes transverse to the direction of propagation.

FIG. 1 is a schematic diagram of a circuit interrupter system 2 according to an exemplary embodiment of the present invention. Circuit interrupter system 2 includes a configurable circuit interrupter 4 (in the illustrated, non-limiting embodiment, configurable circuit interrupter 4 is a molded case circuit breaker) having an operating mechanism 6 configured to rapidly open and close the separable contacts of circuit interrupter 4 and an electronic trip unit 8 operatively coupled to operating mechanism 6 which, in an automatic mode of operation, is structured to sense overcurrent conditions and in response thereto move operating mechanism 6 to a state wherein the separable contacts of circuit interrupter 4 are open. As seen in FIG. 1, in the illustrated embodiment, electronic trip unit 8 includes a number of adjustable switches 10 for varying the functional trip settings (such as, for example and without limitation, long delay pickup (Ir), long delay time (LDT), short delay pickup (SDPU), ground fault pickup (GFPU), and short delay time and ground fault time (SDT/GFT)) of electronic trip unit 8. Electronic trip unit 8 also includes a Serial Port Interface (SPI) 12 and a trip unit status indicator 14 (in the form of an LED).

In addition, circuit interrupter system 2 includes a handheld NFC communications device 16 that is structured to communicate with electronic trip unit 8 using near-field communications (NFC) as described in more detail herein. In this configuration, an operator is thus able to: (i) establish functional trip settings for electronic trip unit 8 by inputting the desired settings into a user interface provided on NFC communications device 16 (as an alternative to or replacement of manual switches) and transmitting the settings to electronic trip unit 8 over an NFC interface established between NFC communications device 16 and electronic trip unit 8 as described in greater detail elsewhere herein, and (ii) read the current functional trip settings for electronic trip unit 8 and/or other information from electronic trip unit 8 (e.g., stored information relating to the operation and/or status of circuit interrupter 4, such as cause of trip, load, voltage and harmonics information described elsewhere herein) using NFC communications device 16 and the NFC interface between NFC communications device 16 and electronic trip unit 8 as described in greater detail elsewhere herein.

Figure 2:
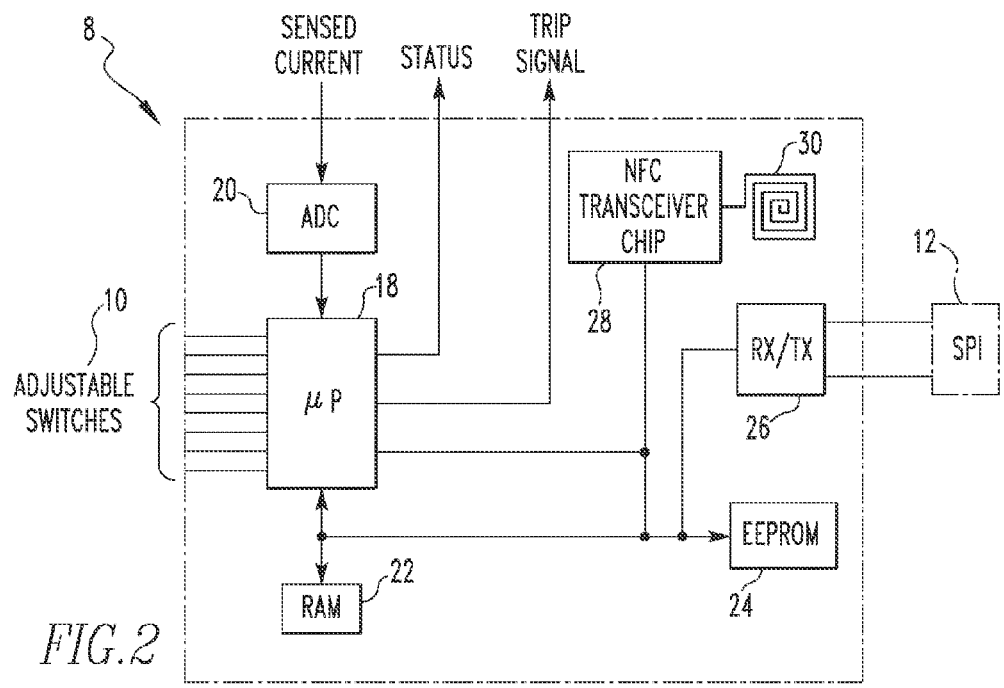
FIG. 2 is a schematic diagram showing certain selected components of an electronic trip unit forming part of a circuit interrupter of the system of FIG. 2 according to an exemplary embodiment.

FIG. 2 is a schematic diagram showing certain selected components of electronic trip unit 8 according to the exemplary embodiment. As seen in FIG. 2, electronic trip unit 8 includes a microprocessor (μP) 18 which controls the operation of electronic trip unit 8. Alternatively, microprocessor 18 may be another type of processing or control unit, such as, without limitation, a microcontroller or some other suitable processing device. Electronic trip unit 8 further includes an analog-to-digital converter (ADC) 20, a random access memory (RAM) 22 and an EEPROM 24, each of which is coupled to microprocessor 18. ADC 18 is structured to receive signals, such as a number of current signals (indicating the current of each phase of the system to which circuit interrupter 4 is connected), that are sensed by sensors (not shown; e.g., a number of current transformers or Rogowski coils) forming part of circuit interrupter 4 and convert those signals to digital data that is appropriate for microprocessor 18. As will be appreciated, that data may be stored in RAM 22 and/or used by the trip unit program implemented in microprocessor 18 in determining whether and when to issue a trip signal for tripping operating mechanism 6. In addition, in the exemplary embodiment, EEPROM 24 stores (in nonvolatile memory) the functional trip settings (such as, for example and without limitation, long delay pickup (Ir), long delay time (LDT), short delay pickup (SDPU), ground fault pickup (GFPU), and short delay time and ground fault time (SDT/GFT)) of electronic trip unit 8, which are read into microprocessor 18 as needed by the trip unit program. Electronic trip unit 8 also includes a serial port interface (SPI) 12 coupled to a communication interface 26, which in turn is operatively coupled to microprocessor 18 to allow for serial communication with microprocessor 18.

Electronic trip unit 8 further includes an NFC transceiver chip 28 coupled to an NFC coupling element 30, such as an antenna or coil. NFC transceiver chip 28 is an integrated circuit chip that is configured to conduct near-field communications as described elsewhere herein. In the exemplary embodiment, NFC transceiver chip 28 includes a wireless controller portion and a non-volatile memory portion (e.g., without limitation, FRAM), and may be, for example and without limitation, the TRF7970a transceiver chip sold by Texas Instruments Incorporated or the WM710xx transceiver chip sold by Ramtron International Corporation. As described elsewhere herein, NFC transceiver chip 28 coupled to NFC coupling element 30 allows electronic trip unit 8 to engage in near-field communications with NFC communications device 16.

Figure 3:
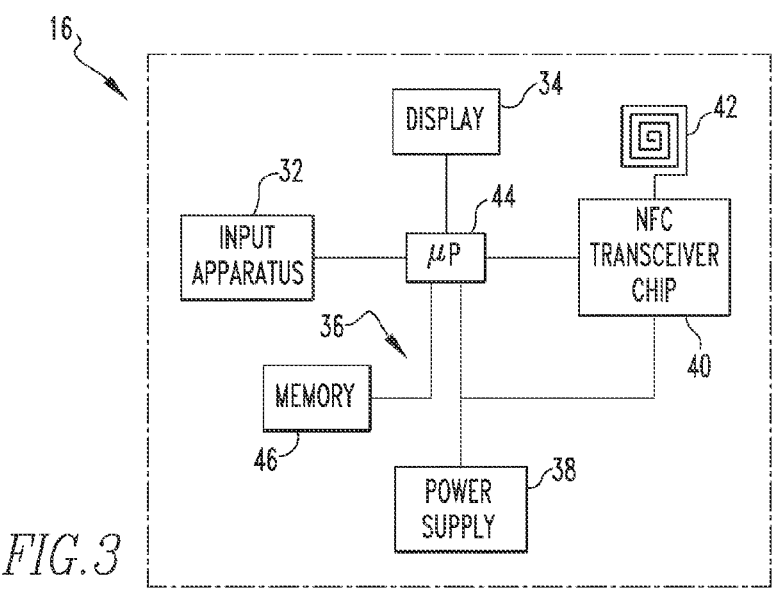
FIG. 3 is a schematic diagram showing certain selected components of an NFC communications device forming part of the system of FIG. 2 according to an exemplary embodiment.

FIG. 3 is a schematic diagram showing certain selected components of NFC communications device 16 according to the exemplary embodiment. NFC communications device 16 may be a device dedicated to the function of engaging in near-field communications with electronic trip unit 8 as described herein, or, alternatively, may be an electronic device, such as smartphone, having more general purpose capabilities (e.g., phone or Internet browsing functionality) that also has near-field communications capabilities that are specifically adapted (e.g., through software) for engaging in near-field communications with electronic trip unit 8 as described herein.

As seen in FIG. 3, NFC communications device 16 includes an input apparatus 32 (e.g., without limitation, a keyboard, a keypad, or a touch screen), a display 34 (e.g., without limitation, an LCD), a processor apparatus 36, and a power supply 38 (e.g., without limitation, a rechargeable battery). A user is able to provide input into processor apparatus 36 using input apparatus 32, and processor apparatus 36 provides output signals to display 34 to enable display 34 to display information to the user. NFC communications device 16 further includes an NFC transceiver chip 40 (similar to NFC transceiver chip 28 described herein) coupled to an NFC coupling element 42 (similar to NFC coupling element 30 described herein). NFC transceiver chip 40 coupled to NFC coupling element 42 is structured to enable NFC communications device 16 to engage in near-field communications with electronic trip unit 8 through coupling/interaction with NFC transceiver chip 28 and NFC coupling element 30 as described in more detail elsewhere herein.

Processor apparatus 36 comprises a microprocessor (μP) 44 (or other suitable processing device) and a memory 46 that interfaces with microprocessor 44. Memory 46 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. Memory 46 has a number of routines stored therein that are executable by microprocessor 44. One or more of the routines implement (by way of computer/processor executable instructions) a software application/system that is configured to, among other things, enable a user to set, monitor, display and/or change conditions, parameters, settings and/or events within circuit interrupter 4 using near-field communications as described herein.

In operation, NFC communications device 16 may be used to configure circuit interrupter 4 by establishing functional trip settings for electronic trip unit 8 in the following manner (a so-called "programming procedure"). First, using input apparatus 42, a user inputs the desired settings into NFC communications device 16. Those settings are stored in memory 46. The user then brings NFC communications device 16 into close proximity with electronic trip unit 8. In particular, NFC communications device 16 is brought close enough to allow for a near-field coupling interface to be established between NFC communications device 16 and electronic trip unit 8 (e.g., within 4 cm or less). The user then initiates a programming procedure using input apparatus 42 (e.g., by pressing a predetermined button). In response, NFC communications device 16 will cause information including the stored functional trip settings to be transferred to electronic trip unit 8 over an NFC interface between the two devices. In particular, NFC transceiver chip 40 will cause NFC coupling element 42 to radiate an RF near-field in a manner wherein the information to be transferred (the functional trip settings) is embedded (e.g., via modulation) in the radiated near-field. That radiated near-field will induce a field in NFC coupling element 30 of electronic trip unit 8 (which is within the radiated near-field). The induced field is provided to NFC transceiver chip 28, which converts it back into digital information (e.g., functional trip settings) that may be used by microprocessor 18. The transferred functional trip settings are stored in the non-volatile memory portion of NFC transceiver chip 28 and, in the exemplary embodiment, in EEPROM 24 at the appropriate time for use by microprocessor 18 as described elsewhere herein (i.e., by the trip unit program).

NFC communications device 16 may also be used to read the current functional trip settings for electronic trip unit 8 in the following manner (a so-called "read procedure"). First, the user brings NFC communications device 16 into close proximity with electronic trip unit 8. In particular, NFC communications device 16 is brought close enough to allow for a near-field coupling interface to be established between NFC communications device 16 and electronic trip unit 8 (e.g., within 4 cm or less). The user then initiates a read procedure using input apparatus 42 (e.g., by pressing a predetermined button). In response, NFC communications device 16 will cause information including a read request to be transferred to electronic trip unit 8 over an NFC interface between the two devices as described elsewhere herein. In response, NFC transceiver chip 28 will obtain the current settings of electronic trip unit 8 (in the exemplary embodiment, those settings are stored in both the non-volatile memory portion of NFC transceiver chip 28 and EEPROM 24) and transfer those settings to NFC communications device 16 over the NFC interface between the two devices as described elsewhere herein. The received information may then be displayed to the user using display 34.

In one exemplary embodiment, the programming and read procedures just described may be performed when auxiliary power is being provided to circuit interrupter 4. In such a case, the auxiliary power is available for providing power to each of the components of electronic trip unit 8.

In another exemplary embodiment, the programming and read procedures just described may also be performed when auxiliary power is not being provided to circuit interrupter 4. In such as case, NFC transceiver chip 28 of electronic trip unit 8 is configured as a passive device. In such a configuration, NFC transceiver chip 28 derives the power it needs for operation from the field that is radiated by NFC coupling element 42 and induced in NFC coupling element 30. As will be appreciated, this capability may be particularly advantageous in a situation wherein a number of circuit interrupters 4 need to be commissioned in an environment, such as in a new building, where power is not available to the environment (e.g., the new building has not yet been energized). Since each of the circuit interrupters 4 can be fully configured with trip settings as just described without the need for auxiliary power, the environment can be fully commissioned (for example at the time of initial installation) and ready for operation when the power does becomes available.

Figure 4:
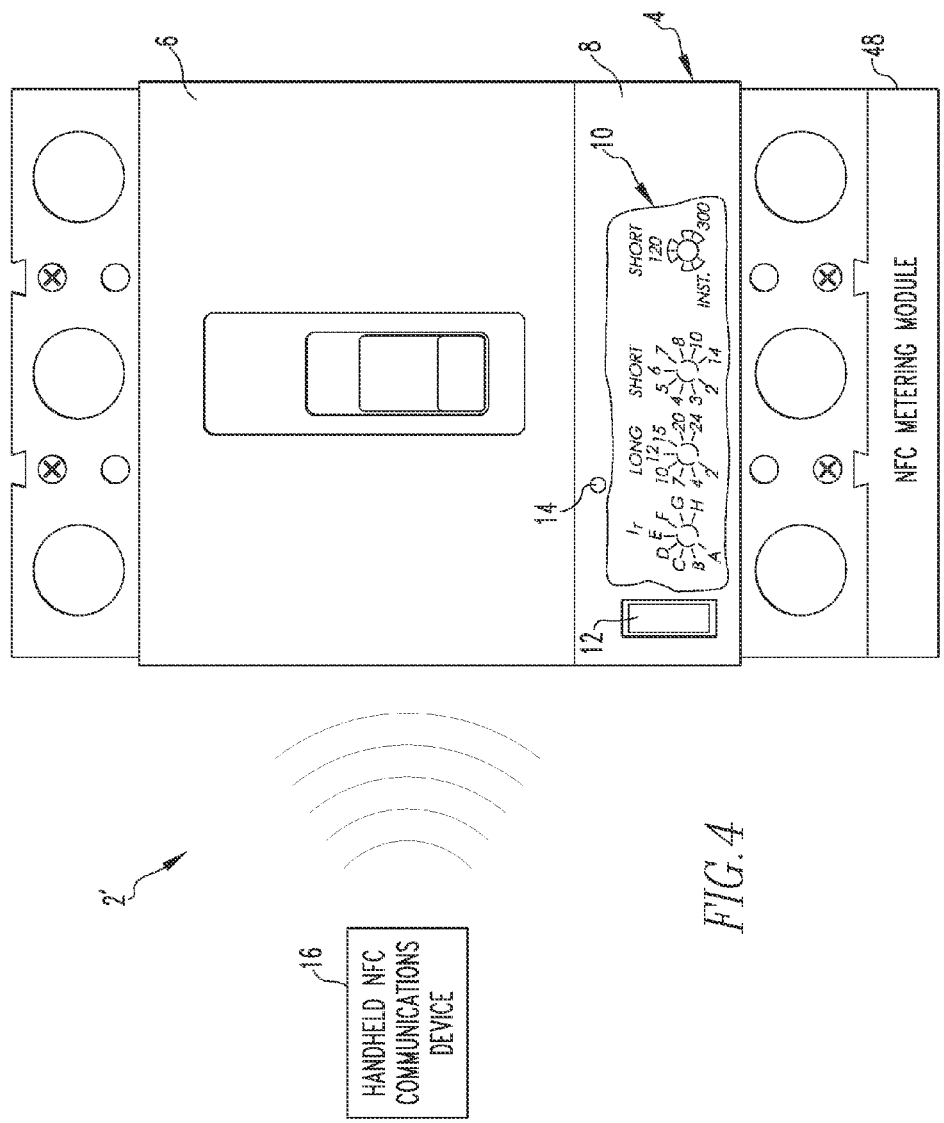
FIG. 4 is a schematic diagram of a circuit interrupter system according to an alternative exemplary embodiment of the present invention.
Figure 5:
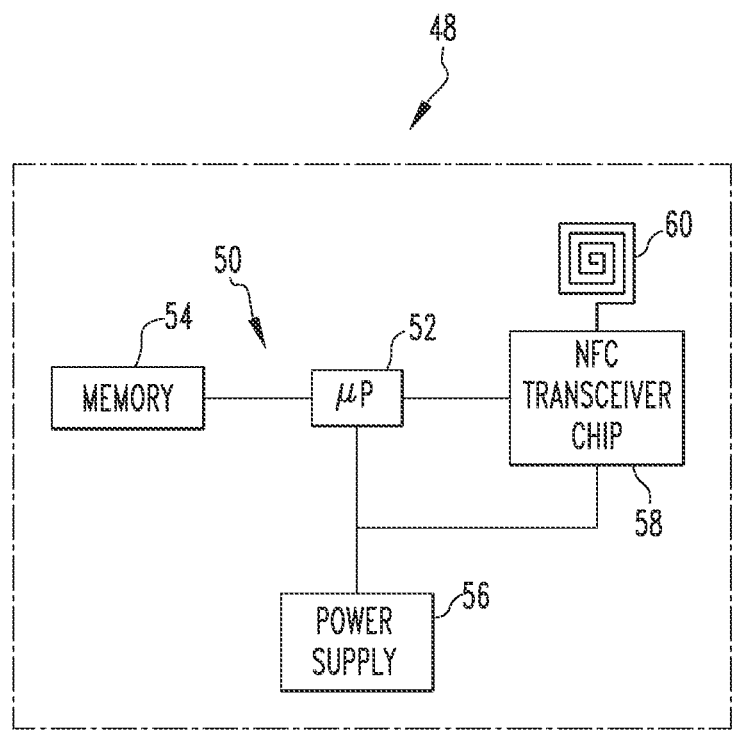
FIG. 5 is a schematic diagram showing certain selected components of an NFC metering module forming part of the system of FIG. 4 according to an exemplary embodiment.

FIG. 4 is a schematic diagram of a circuit interrupter system 2' according to an alternative exemplary embodiment of the present invention. Circuit interrupter system 2' includes many of the same components as circuit interrupter system 2, and like components are labeled with like reference numerals. As seen in FIG. 4, circuit interrupter system 2' further includes NFC metering module 48 that is operatively coupled to circuit interrupter 4. In the exemplary embodiment, NFC metering module 48 is a device configured to measure phase current and voltage information of circuit interrupter 4 and/or calculate power and energy information of circuit interrupter 4, and to communicate such information to a local network or the Internet. NFC metering module 48 is thus similar in operation to the PM3 Meter and Communications Module sold by the assignee of the present invention. However, in the exemplary embodiment, NFC metering module 48 receives the phase current and voltage information (and possibly other information) from electronic trip unit 8 over an NFC interface between electronic trip unit 8 and NFC metering module 48 (rather than through a hard-wired connection). In particular, as shown schematically in FIG. 5, NFC metering module 48 includes a processor apparatus 50 (including a microprocessor (µP) 52 (or other suitable processing device) and a memory 54 that interfaces with microprocessor 52), a power supply 56 (e.g., without limitation, a rechargeable battery), and an NFC transceiver chip 58 (similar to NFC transceiver chip 28 described herein) coupled to an NFC coupling element 60 (similar to NFC coupling element 30 described herein). NFC transceiver chip 58 coupled to NFC coupling element 60 is structured to enable NFC metering module 48 to engage in near-field communications with electronic trip unit 8 through coupling/interaction with NFC transceiver chip 28 and NFC coupling element 30 as described in more detail elsewhere herein in order to wirelessly receive the phase current and voltage information (and possibly other information) from electronic trip unit 8. The phase current and voltage information and/or power and energy information calculated by microprocessor 52 may then be communicated by NFC metering module 48 using an appropriate communications gateway in a known manner.

In one particular embodiment, the phase current and voltage information and/or power and energy information (and possibly other information) may be communicated by NFC metering module 48 to NFC communications device 16 over an NFC interface between the two devices as described elsewhere herein. The received information may then be displayed to the user using display 34.

Figure 6:
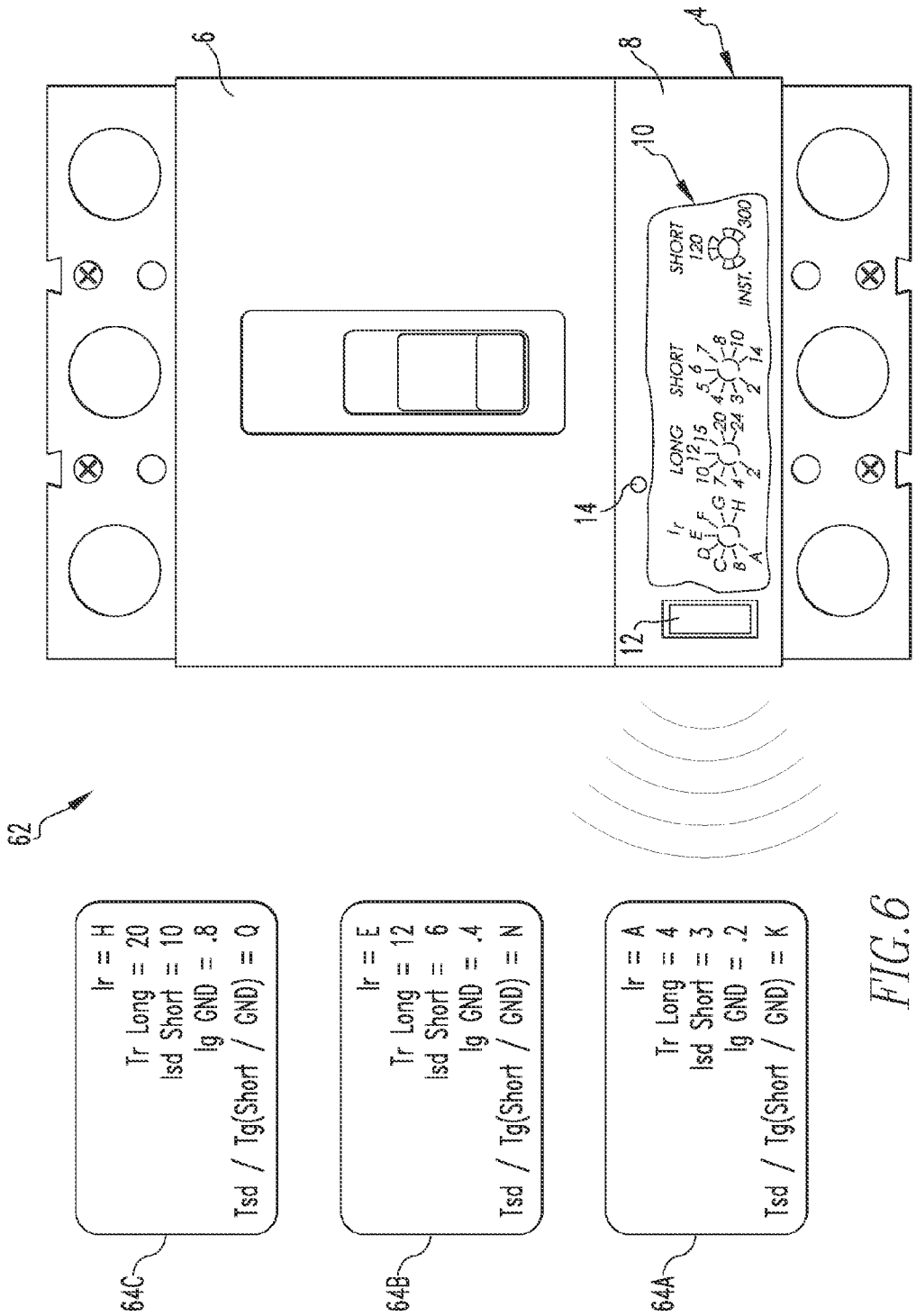
FIG. 6 is a schematic diagram of a circuit interrupter system according to another alternative exemplary embodiment of the present invention.

FIG. 6 is a schematic diagram of a circuit interrupter system 62 according to another alternative exemplary embodiment of the present invention. Circuit interrupter system 62 includes a configurable circuit interrupter 4 as described elsewhere herein and a number of configuration card devices 64. In the illustrated embodiment, three configuration card devices 64 (labeled 64A, 64B and 64C) are shown. It will be understood, however, that three configuration card devices 64 is meant to be exemplary only, and that circuit interrupter system 62 may employ more or less than three configuration card devices 64. As used herein, the term "configuration card device" shall refer to a pocket-sized card having a housing made of, for example, plastic, and an embedded integrated circuit. Each of the configuration card devices 64 is preprogrammed with certain stored configuration information (e.g., predetermined functional trip settings) for the circuit interrupter 4, and, as described in detail below, is structured to transmit its stored configuration information to electronic trip unit 8 over an NFC interface between the configuration card device 64 and electronic trip unit 8 in order to configure electronic trip unit 8. As seen in FIG. 6, in the illustrated embodiment, each of the configuration card devices 64A, 64B and 64C stores a different set of predetermined functional trip settings. In addition, each configuration card device 64 may be labeled with (e.g., printed thereon) the predetermined functional trip settings associated therewith and/or information identifying the circuit interrupter 4.

Figure 7:
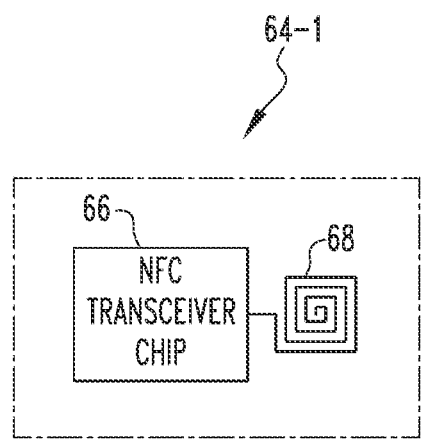
FIG. 7 is a schematic diagram showing certain selected components of a configuration card device forming part of the system of FIG. 6 according to an exemplary embodiment.

FIG. 7 is a schematic diagram showing certain selected components of configuration card device 64 (labeled 64-1) according to one exemplary embodiment. Configuration card device 64-1 of the present embodiment includes an NFC transceiver chip 66 (similar to NFC transceiver chip 28 described herein) coupled to an NFC coupling element 68 (similar to NFC coupling element 30 described herein). The non-volatile memory portion of NFC transceiver chip 28 stores the configuration information associated with configuration card device 64-1. In addition, as seen in FIG. 7, configuration card device 64-1 of the present embodiment does not include an on-board power supply, and thus configuration card device 64-1 is configured as a passive NFC device. Furthermore, as described below, in this embodiment, electronic trip unit 8 functions as an active NFC device and provide the power needed by configuration card device 64-1 to configuration card device 64-1 over the NFC interface between the two devices. As will be appreciated, this requires electronic trip unit 8, and thus circuit interrupter 4, to have auxiliary power.

In particular, in operation, when it is desired to configure electronic trip unit 8 using the configuration information associated with configuration card device 64-1, the user brings configuration card device 64-1 into close proximity with electronic trip unit 8. Configuration card device 64-1 is brought close enough to allow for a near-field coupling interface to be established between electronic trip unit 8 and configuration card device 64-1 (e.g., within 4 cm or less). When this is done, the RF near-field being radiated by NFC coupling element 30 of electronic trip unit 8 will induce a field in NFC coupling element 68 of configuration card device 64-1, which is used to provide power to NFC transceiver chip 66. In response, NFC transceiver chip 66 will cause the stored configuration information to be transferred to electronic trip unit 8 over the NFC interface between the two devices. In particular, NFC transceiver chip 66 will cause NFC coupling element 68 to radiate an RF near-field in a manner wherein the information to be transferred (the configuration information, e.g., the functional trip settings) is embedded (e.g., via modulation) in the radiated near-field. That radiated near-field will induce a field in NFC coupling element 30 of electronic trip unit 8 (which is within the radiated near-field). The induced field is provided to NFC transceiver chip 28, which converts it back into digital information (i.e., functional trip settings) that may be used by microprocessor 18. The transferred functional trip settings are stored in the non-volatile memory portion of NFC transceiver chip 28 and, in the exemplary embodiment, in EEPROM 24 for use by microprocessor 18 as described elsewhere herein (i.e., by the trip unit program). In the exemplary embodiment, feedback (e.g., in the form of a blinking LED or some other suitable form) is provided to the user when the configuration steps as just described have been successfully completed.

Figure 8:
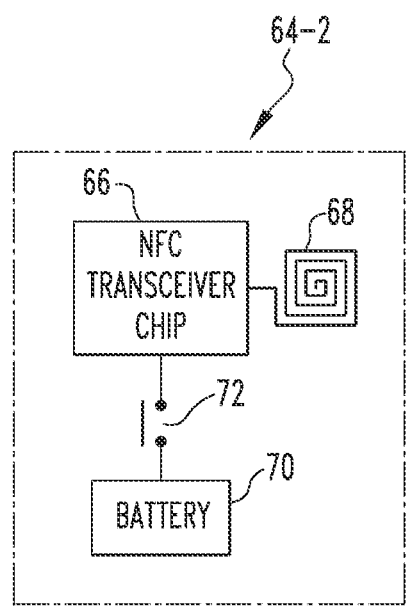
FIG. 8 is a schematic diagram showing certain selected components of a configuration card device forming part of the system of FIG. 6 according to another exemplary embodiment.

FIG. 8 is a schematic diagram showing certain selected components of configuration card device 64 (labeled 64-2) according to an alternative exemplary embodiment. Configuration card device 64-2 of this embodiment includes an NFC transceiver chip 66 coupled to an NFC coupling element 68 as described above. The non-volatile memory portion of NFC transceiver chip 28 stores the configuration information associated with configuration card device 64-2. In addition, as seen in FIG. 8, configuration card device 64-2 of the present embodiment includes an on-board power supply in the form of a battery 70 that is selectively coupled to NFC transceiver chip 66 by a manually operated switch 72. Thus, configuration card device 64-2 is configured to operate as an active NFC device, with power being provided to NFC transceiver chip 66 via actuation of switch 72. As a result, in this embodiment, it is not necessary for electronic trip unit 8, and thus circuit interrupter 4, to have auxiliary power in order for the configuration information associated with configuration card device 64-2 to be transferred to electronic trip unit 8 over the NFC interface. Instead, power for NFC transceiver chip 28 of electronic trip unit 8 will be transferred thereto (along with the stored configuration information) over the NFC interface when configuration card device 64-2 is brought into proximity with electronic trip unit 8 and switch 72 is actuated.

Thus, in circuit interrupter system 62, employing either configuration card devices 64-1 or 64-2, a number of different configuration card devices 64 (each programmed with different configuration information) may be provided to a user, such as a maintenance person, and the user may select one of the configuration card devices 64 to configure circuit interrupter 4 as needed. Alternatively, a service provider, such as the provider of the circuit interrupter 4, may provide a user with an appropriately programmed configuration card device 64 as needed to configure circuit interrupter 4.

Moreover, the above exemplary embodiments have been described in connection with an electrical distribution system that includes a circuit interrupter wherein configuration information is provided to and/or read from the circuit interrupter using near-field communications. It will be understood, however, that the concepts of the present invention are not limited to circuit interrupters, but rather may be employed with other types of electrical distribution systems that include other types electrical devices or components that require configuration information to be provided to and/or read from the electrical device or component. For example, such electrical devices or components may include, without limitation, a metering device, a monitoring device, a control device, or any component forming part of a switchgear, which as is known, is a combination of electrical disconnect switches, fuses or circuit breakers used to control, protect and isolate electrical equipment.

Figure 9:
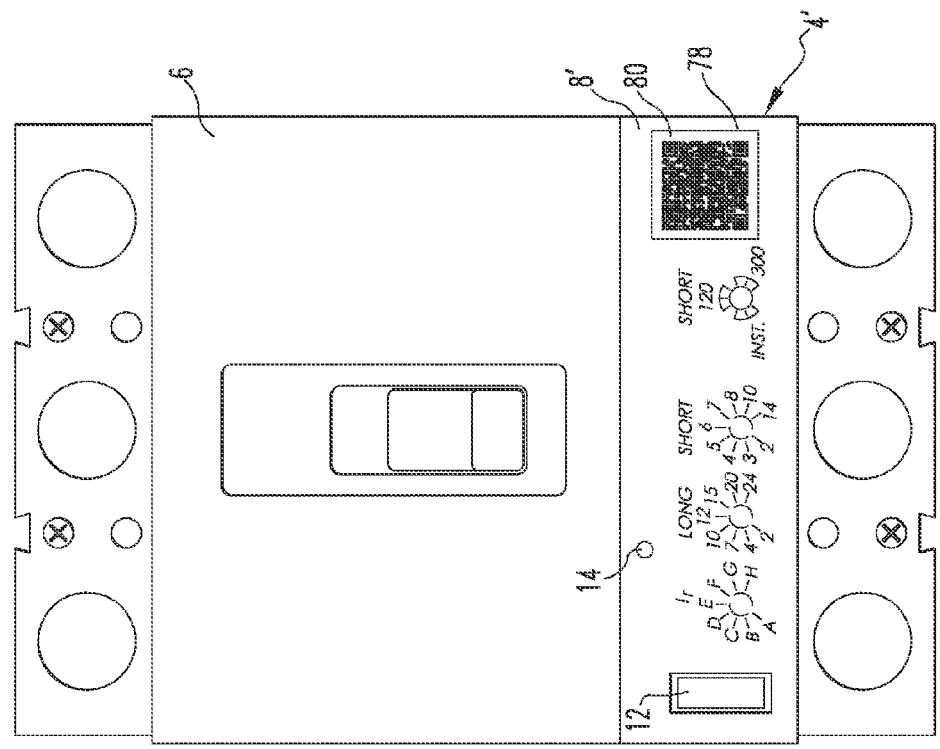
FIG. 9 is a schematic diagram of a circuit interrupter system according to another alternative exemplary embodiment of the present invention.
Figure 9:
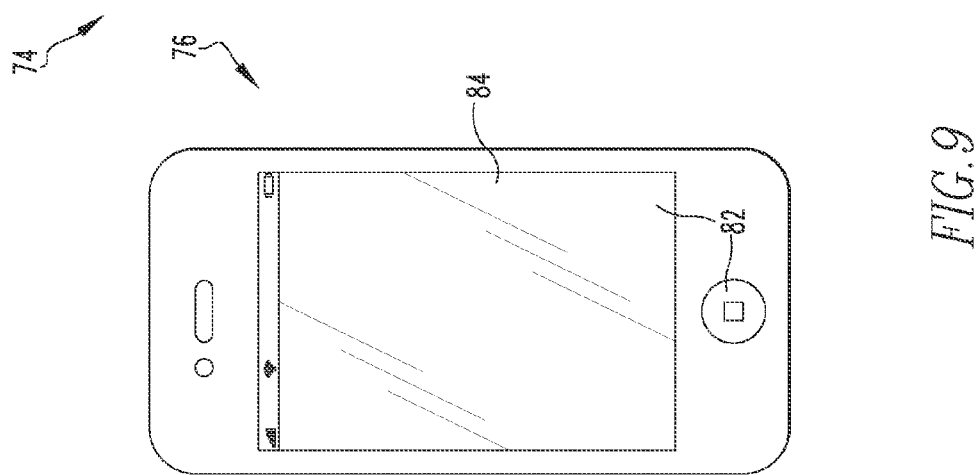

FIG. 9 is a schematic diagram of a circuit interrupter system 74 according to yet another alternative exemplary embodiment of the present invention. Circuit interrupter system 74 includes a configurable circuit interrupter 4' and a portable computing device 76.

Figure 10:
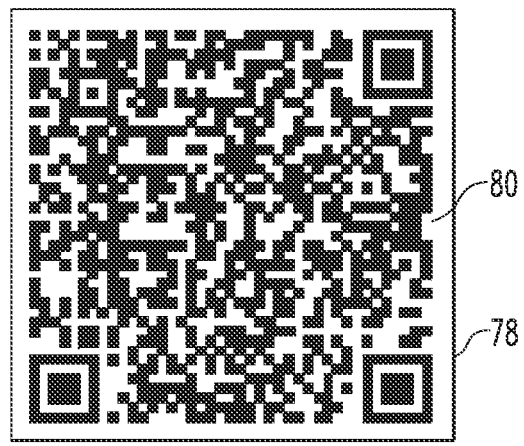
FIG. 10 is a schematic diagram showing a two-dimensional (2D) barcode display on a display device of a circuit interrupter of the system of FIG. 9 according to an exemplary embodiment.

Circuit interrupter 4' is similar to circuit interrupter 4 and includes an operating mechanism 6 as described elsewhere herein. Circuit interrupter 4', however, includes a modified electronic trip unit 8' that is similar to electronic trip unit 8 in all respects except that it further includes a display device 78, which in the exemplary embodiment is an LCD. In one aspect, electronic trip unit 8' is structured and configured (by way of one or more routines stored in RAM 22 and executable by microprocessor 18 of electronic trip unit 8') to cause display device 78 to display data relating to the operation and/or status of circuit interrupter 4' in the form of a two-dimensional (2D) barcode 80, such as, without limitation, a standard Datamatrix barcode (see FIG. 10), that is generated by electronic trip unit 8'. As described in more detail below, portable computing device 76 is structured to capture an image of 2D barcode 80, decode the 2D barcode 80 to obtain the data encoded therein, and display information based on the decoded data in a user friendly format. Particular examples of such information being encoded into 2D barcode 80 and subsequently displayed on portable computing device 76 are provided elsewhere herein following the description of the exemplary portable computing device 76.

Figure 11:
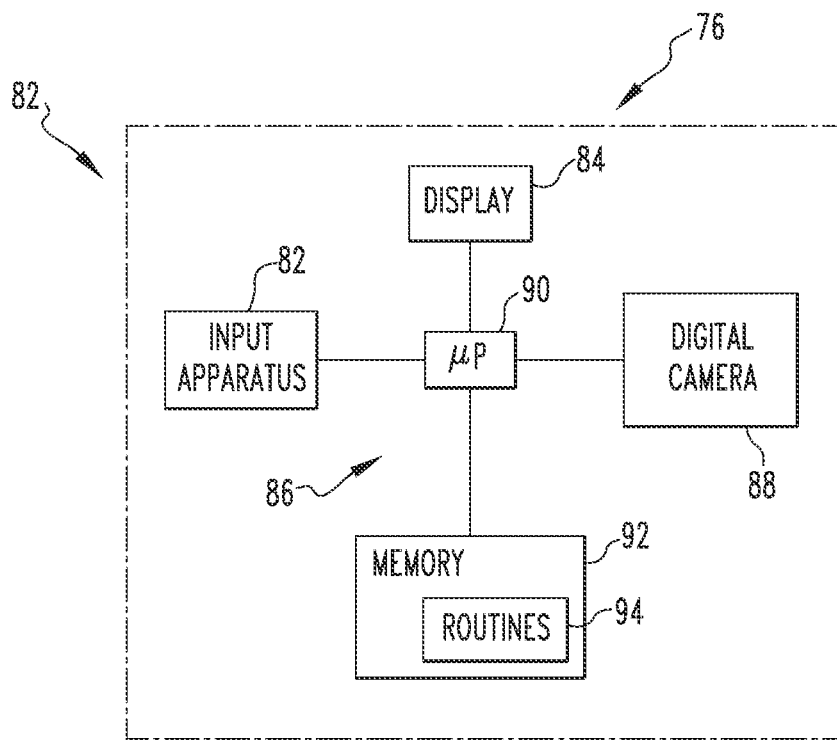
FIG. 11 is a schematic diagram of a portable computing device forming part of the system of FIG. 9 according to an exemplary embodiment.
Figure 12:
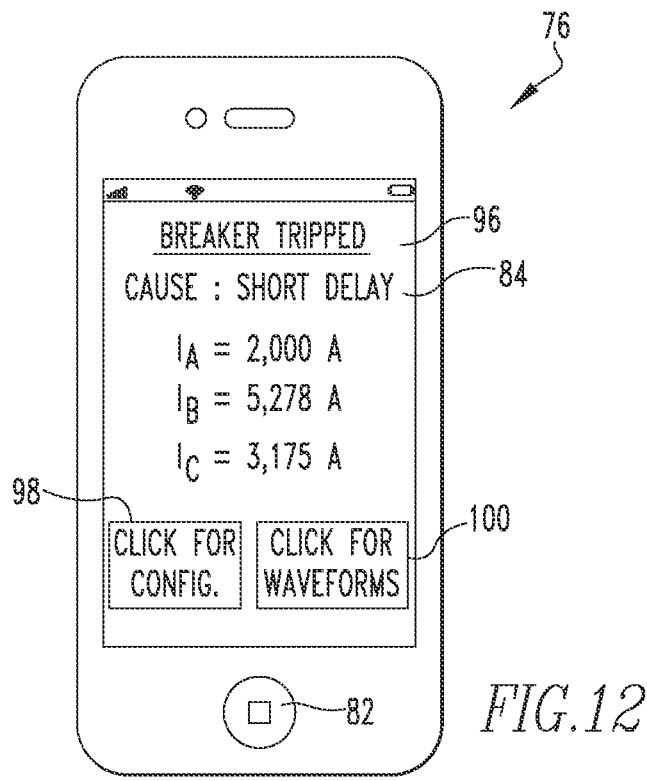
FIGS. 12-16B are top plan views of the portable computing device of FIGS. 10 and 11 showing a number of different screens thereof according to various exemplary embodiments.

An exemplary portable computing device 76 that may be used in circuit interrupter system 74 is depicted generally in FIG. 9 and schematically in FIG. 11. The exemplary portable computing device 76 may be, for example and without limitation, a smartphone, a tablet PC, or a laptop or notebook PC. As seen in FIGS. 9 and/or 11, portable computing device 76 includes an input apparatus 82 (e.g., a keyboard, a keypad, a touch screen, or some combination thereof), a display 84, a processor apparatus 86, and a digital camera 88 (including an image capture device such as a CCD). A user is able to provide input into processor apparatus 86 using input apparatus 82, and processor apparatus 86 provides output signals to display 84 to enable display 84 to display information to the user as described in detail herein. Processor apparatus 86 comprises a microprocessor (μP) 90 (or other suitable processing device) and a memory 92 that interfaces with microprocessor 90. Memory 92 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. Memory 92 has a number of routines 94 stored therein that are executable by microprocessor 90. One or more of the routines 94 implement (by way of computer/processor executable instructions) a software application that is configured to decode the 2D barcode 80 to obtain the data encoded therein, and display information based on the decoded data on display 84 (routines 94 thus comprise a computer program product tangibly embodied on a computer readable medium of the portable computing device 76).

As is known in the art, when a breaker, such as circuit interrupter 4', trips, it can be for several reasons. Each reason has different implications for the servicing electrician. In addition, while a breaker, such as circuit interrupter 4', is closed (pre-trip) and carrying normal current, data about that power-flow is valuable for diagnosing other problems. Thus, communicating reasons for a trip and/or data about pre-trip power-flow can be very helpful to a servicing electrician to enable him or her to quickly find and fix whatever problem exists in the wiring or powered equipment. Accordingly, in one exemplary embodiment, the data that is encoded into 2D barcode 80 for display on display 78 may include one or more of the following: (1) cause-of-trip information, including one of: (a) Short Delay, meaning there was a large overload for a short time (probably a piece of equipment is failing), (b) Long Delay, meaning there was a small overload for a long time (probably too much equipment on that circuit), (c) Ground-Fault, meaning somewhere current is flowing to ground causing a dangerous situation, and (d) Instantaneous, meaning a catastrophic event, usually a direct short in the wires, has occurred; (2) load information including the actual values of the current flowing in the three phases of the breaker, such as circuit interrupter 4', for a certain amount to time (e.g., N seconds) prior to trip (for example if the breaker is feeding a three phase motor, the phases should all be roughly equal; if one phase is off, that might indicate that something is wrong with the motor such that it will probably fail (burn-out the windings) or be unable to deliver the shaft power needed); (3) voltage information including the actual measurement of phase to phase voltages for a certain amount of time prior to trip (much like current, an imbalance indicates problems in the connected devices, such as, without limitation, an upstream transformer that is failing or a downstream load that is bad); and (4) harmonics information (all electrical devices emit a certain amount of energy across the spectrum; excessive levels can cause interference in other devices; harmonics information can be used as a diagnostic to fix those interference problems).

FIGS. 12-15 illustrate operation of circuit interrupter system 74 according to an exemplary embodiment using one particular, non-limiting example implementation wherein cause of trip information, pre-trip power-flow information and certain other information is transferred to and displayed on portable computing device 76. In particular, in the present example, electronic trip unit 8' is be configured to, in the event of trip in circuit interrupter 4', create a number 2D barcodes 80 by encoding into barcode form the following information: (i) the cause of the trip, (ii) the values of the current flowing in the three phases of circuit interrupter 4' prior to trip, (iii) configuration settings information for circuit interrupter 4' that are relevant to the trip, (iv) service related information that is relevant to the trip (described in greater detail herein), and (v) voltage and/or current waveform information for a certain amount to time (e.g., N seconds) prior to trip. Depending on the capacity of the particular 2D barcode implementation that is used, that information may be encoded in a single 2D barcode 80 or in multiple 2D barcodes 80. Electronic trip unit 8' then causes the 2D barcode or barcodes 80 to be displayed on display 78. In the event multiple 2D barcodes 80 are used, the 2D barcodes 80 are displayed in a repeating sequence.

Figure 13:
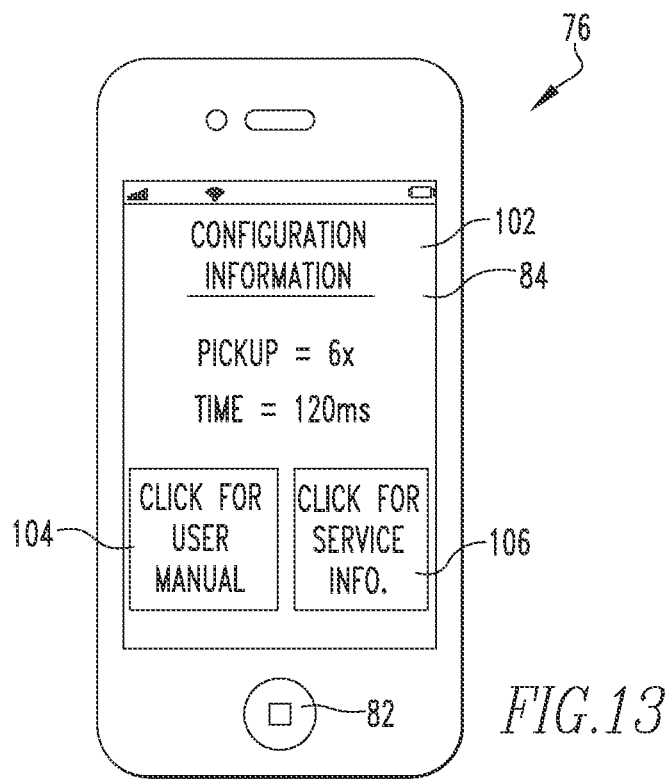
Figure 14:
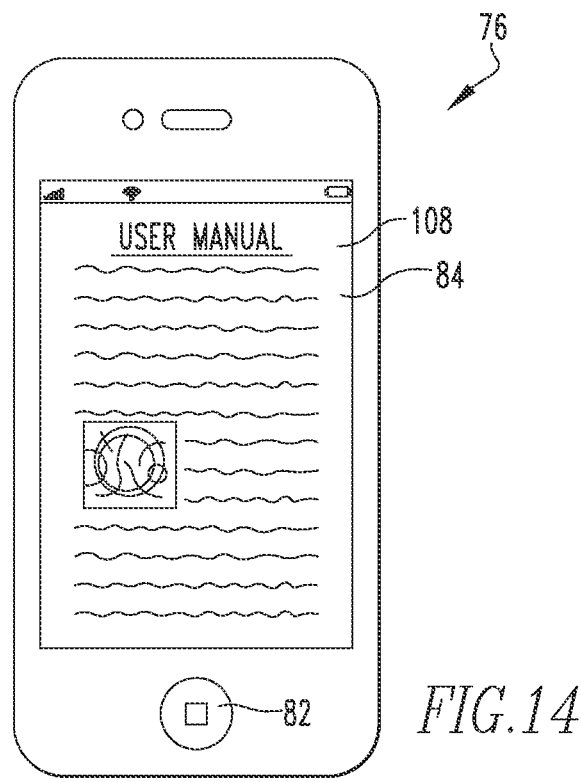
Figure 15:
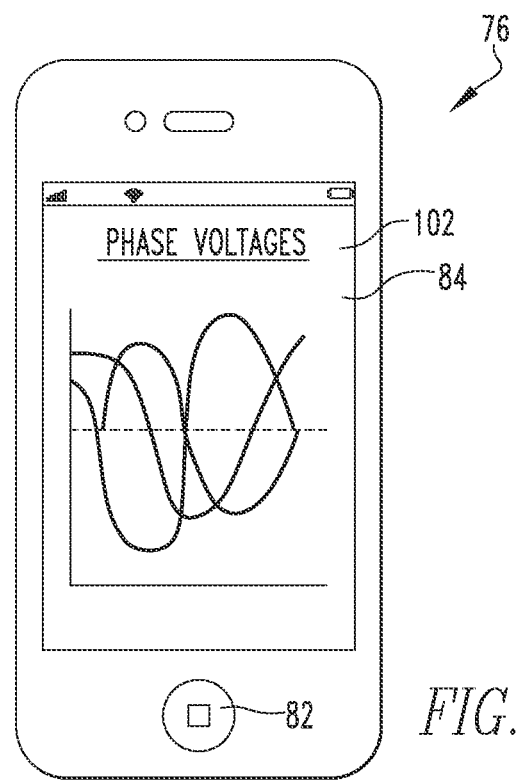

Next, digital camera 88 of portable computing device 76 is used to capture a digital image of each of the 2D barcodes 80, and the software of portable computing device 76 as described herein is then used to decode the information contained in each of the 2D barcodes 80. Once decoded, that information may be displayed to the user on display 84 of portable computing device 76. In particular, in the present example, referring to FIG. 12, a screen 96 is provided on display 84. Screen 96 includes the cause of the trip (Short Delay in the present example) and the values of the current flowing in the three phases of circuit interrupter 4' just prior to trip ($I_A$=2,000 A, $I_B$=5,278 A and $I_C$=3,175 A in the present example). Screen 96 also includes buttons 98 and 100 which may be clicked (selected) in order to cause additional information to be displayed on display 84. Specifically, as seen in FIG. 13, when button 98 is selected, a screen 102 is provided on display 84. Screen 102 includes the configuration settings for circuit interrupter 4' that are relevant to the Short Delay trip. Screen 102 also includes buttons 104 and 106 which may be clicked (selected) in order to cause additional information to be displayed on display 84. In particular, as seen in FIG. 13, button 104 includes a link (e.g., URL) to the user manual or a troubleshooting guide for circuit interrupter 4'. When button 104 is selected, a pdf of the user manual troubleshooting guide is obtained (e.g., from a remote sever) and is displayed on a screen 108 on display 84 as shown in FIG. 14. In addition, in the present example, button 106 includes a link to contact information for a service electrician or the like for circuit interrupter 4', which, when selected, will cause that contact information to be displayed on display 84. Referring again to FIG. 12, when button 100 is selected, a screen 110 shown in FIG. 15 is provided on display 84. Screen 110 includes voltage waveforms for circuit interrupter 4' for a certain amount to time (e.g., N seconds) prior to trip.

Figure 16A:
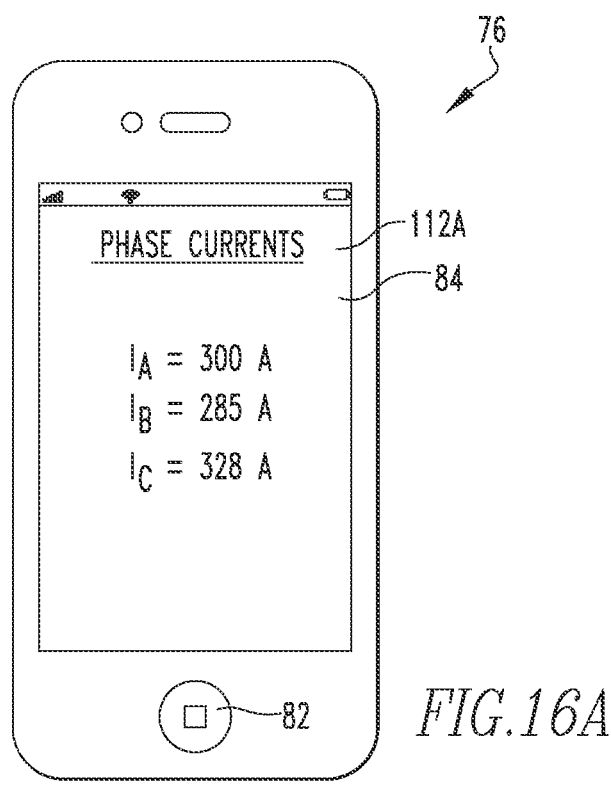
Figure 16B:
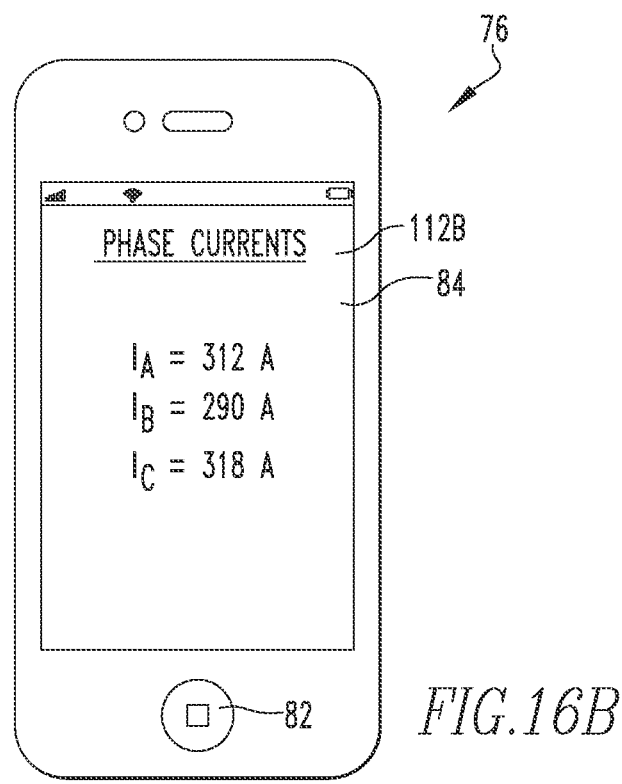

FIGS. 16A-16B illustrate operation of circuit interrupter system 74 according to an alternative exemplary embodiment wherein current and/or voltage information for the three phases of circuit interrupter 4' is transferred to and displayed on portable computing device 76 in near real time. In particular, in this embodiment, electronic trip unit 8' is configured to repeatedly and periodically (e.g., without limitation, once every second) create a 2D barcode 80 that has encoded therein the then current phase current values and/or phase voltage values for circuit interrupter 4'. In the illustrated example, phase current values are employed. Each 2D barcode 80 is displayed on display 78 until it is replaced with the next, updated 2D barcode 80, and so on. Thus, someone such as a service technician or electrician can use digital camera 88 of portable computing device 76 to capture a digital image of each of the 2D barcodes 80 as they are sequentially generated. The captured images may then be sequentially decoded and used to create sequential screens 112 shown in FIGS. 16A and 16B (and so on) which display the phase currents of circuit interrupter 4' on a near real time basis. As such, portable computing device 76 is able to operate as a near real time meter for circuit interrupter 4'. As will be appreciated, rather than sequentially encoding and displaying phase current values as in the illustrated example, other types of information, such as phase voltage values and phase current or voltage waveforms, may be sequentially encoded and displayed as just described.

According to a further particular exemplary embodiment, portable computing device 76 may be configured to transmit the images of the 2D barcodes 80 that it captures to another (e.g., remotely located) computer system for further analysis and/or storage/record keeping.

In still another particular exemplary embodiment, electronic trip unit 8' may be configured to display the 2D barcodes 80 one pixel at a time for capture by digital camera 88 of portable computing device 76 and subsequent decoding thereby. In such a configuration, the 2D barcodes 80 would in essence be flashed in a sequential pattern that could be captured as a movie by portable computing device 76.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical distribution system, comprising:
a circuit interrupter having a first near-field communications chip coupled to a first near-field communications coupling element; and
a configuration card device having a second near-field communications chip coupled to a second near-field communications coupling element and a non-volatile memory, wherein the configuration card device comprises a card having a housing and the second near-field communications chip and the non-volatile memory embedded in the housing, wherein the configuration card device is structured to transmit first information to the first near-field communications chip over a near-field communications interface established between the first near-field communications coupling element and the second near-field communications coupling element, wherein the first information comprises a set of predetermined functional trip settings for the circuit interrupter preprogrammed and stored in the non-volatile memory, the set of predetermined functional trip settings indicating a particular configuration for configuring the circuit interrupter, and wherein the configuration card device has the set of predetermined functional trip settings printed on the housing.

2. The system according to claim 1, wherein the configuration card device includes a power supply selectively connectable to the second near-field communications chip, wherein the configuration card device is structured to provide power to the first near-field communications chip over the near-field communications interface such that the first information may be transmitted to the first near-field communications chip over the near-field communications interface when the electrical component does not have auxiliary power.

3. The system according to claim 1, wherein the non-volatile memory is part of the second near-field communications chip.

4. A method of transferring information in an electrical distribution system having a circuit interrupter having a first near-field communications chip coupled to a first near-field communications coupling element and a configuration card device having a second near-field communications chip coupled to a second near-field communications coupling element and a non-volatile memory, and wherein the configuration card device comprises a card having a housing and the second near-field communications chip and the non-volatile memory embedded in the housing, comprising:
establishing a near-field communications interface between the first near-field communications coupling element and the second near-field communications coupling element; and
transmitting first information to the first near-field communications chip over the near-field communications interface, wherein the first information comprises a set of predetermined functional trip settings for the circuit interrupter preprogrammed and stored in the non-volatile memory, the set of predetermined functional trip settings indicating a particular configuration for configuring the circuit interrupter, and wherein the configuration card device has the set of predetermined functional trip settings printed on the housing.

5. The method according to claim 4, wherein the configuration card device includes a power supply selectively connectable to the second near-field communications chip, wherein the method includes providing power to the first near-field communications chip over the near-field communications interface such that the first information may be transmitted to the first near-field communications chip over the near-field communications interface when the electrical component does not have auxiliary power.

6. The method according to claim 4, wherein the non-volatile memory is part of the second near-field communications chip.

7. A method of configuring an electrical component having a first near-field communications chip coupled to a first near-field communications coupling element:
providing a configuration card device having a second near-field communications chip coupled to a second near-field communications coupling element and a non-volatile memory, the configuration card device being preprogrammed with and storing configuration information for the electrical component in the non-volatile memory, the configuration information being a set of predetermined functional trip settings, wherein the configuration card device comprises a card having a housing and the second near-field communications chip and the non-volatile memory embedded in the housing, and wherein the configuration card device has the set of predetermined functional trip settings printed on the housing;

establishing a near-field communications interface between the first near-field communications coupling element and the second near-field communications coupling element;

transmitting the configuration information from the configuration card device to the first near-field communications chip over the near-field communications interface; and configuring the electrical component based on the configuration information.

8. The method according to claim 7, further comprising providing a number of additional configuration card devices each storing additional configuration information for the electrical component and having the additional configuration information printed thereon, and selecting the configuration card device from a group consisting of the configuration card device and each of the additional configuration card devices.

9. The method according to claim 7, wherein the configuration card device includes a power supply selectively connectable to the second near-field communications chip, wherein the method includes providing power to the first near-field communications chip over the near-field communications interface such that the transmitting step is performed when the electrical component does not have auxiliary power.

10. The method according to claim 7, wherein the electrical component is a circuit interrupter, and wherein the configuration information comprises functional trip settings for the circuit interrupter.

11. The method according to claim 7, wherein the non-volatile memory is part of the second near-field communications chip.

* * * * *